United States Patent
Chen et al.

(10) Patent No.: US 9,316,794 B2
(45) Date of Patent: Apr. 19, 2016

(54) LC OPTICAL FIBER CABLE ADAPTER ASSEMBLY

(71) Applicants: Gloriole Electroptic Technology Corp., Kaohsiung (TW); Amphenol Fiber Optic Technology (Shenzhen), Shenzhen, Guangdong Province (CN); SHEN ZHEN WONDERWIN TECHNOLOGY CO., LTD., Shen Zhen, Guang Dong Province (CN)

(72) Inventors: Zhou Chen, Shenzhen (CN); Song-Sheng Li, Shenzhen (CN); Jun-Quan Bao, Shenzhen (CN); Ling-Hua Zhu, Shenzhen (CN); Jim Lin, Kaohsiung (TW); Chia-Hua Wu, Kaohsiung (TW)

(73) Assignees: Gloriole Electropic Technology Corp., Kaohsiung (TW); Amphenol Fiber Optic Technology (Shenzhen), Shenzhen, Guangdong Province (CN); SHEN ZHEN WONDERWIN TECHNOLOGY CO., LTD., Shen Zhen, Guang Dong Province (CN)

( * ) Notice: Subject to any disclaimer, the term of this patent is extended or adjusted under 35 U.S.C. 154(b) by 204 days.

(21) Appl. No.: 14/288,183

(22) Filed: May 27, 2014

(65) Prior Publication Data
US 2015/0205060 A1    Jul. 23, 2015

(30) Foreign Application Priority Data

Jan. 22, 2014 (TW) .................................. 103201328

(51) Int. Cl.
*G02B 6/38* (2006.01)
*G02B 6/36* (2006.01)

(52) U.S. Cl.
CPC ............ *G02B 6/3825* (2013.01); *G02B 6/3672* (2013.01); *G02B 6/3869* (2013.01); *G02B 6/3897* (2013.01)

(58) Field of Classification Search
CPC ............... G02B 6/3628–6/3632; G02B 6/3672
See application file for complete search history.

(56) References Cited

U.S. PATENT DOCUMENTS

| | | | |
|---|---|---|---|
| 2014/0334780 A1* | 11/2014 | Nguyen | G02B 6/3897 385/77 |
| 2016/0011383 A1* | 1/2016 | Lee | G02B 6/3825 385/75 |

\* cited by examiner

*Primary Examiner* — Jerry Rahll
(74) *Attorney, Agent, or Firm* — Muncy, Geissler, Olds & Lowe, P.C.

(57) ABSTRACT

An LC optical fiber cable adapter includes a main body and a connecting mechanism. The main body includes a base wall, and first and second connecting walls extending respectively from opposite lateral edges of the base wall. The first connecting wall has a first front wall segment and a first rear wall segment. The second connecting wall has a second front wall segment and a second rear wall segment. The connecting mechanism includes a first connecting unit provided on the first front wall segment, and two second connecting units. Each of the second connecting units is provided on a respective one of the second front and rear wall segments of the second connecting wall, and has a contour matching that of the first connecting unit.

12 Claims, 14 Drawing Sheets

FIG.17

LC OPTICAL FIBER CABLE ADAPTER ASSEMBLY

CROSS REFERENCE TO RELATED APPLICATION

This application claims priority of Taiwanese Patent Application No. 103201328, filed on Jan. 22, 2014.

BACKGROUND OF THE INVENTION

1. Field of the Invention

The invention relates to an adapter assembly, more particularly to an LC optical fiber cable adapter assembly.

2. Description of the Related Art

At present, optical fiber cables are main instruments for information transmission. In recent years, in order to increase the amount of information flow, a multi-channel adapter has been developed to replace a single-channel adapter so that multiple optical fiber cables can be simultaneously used in transmission of information.

Figure 1:
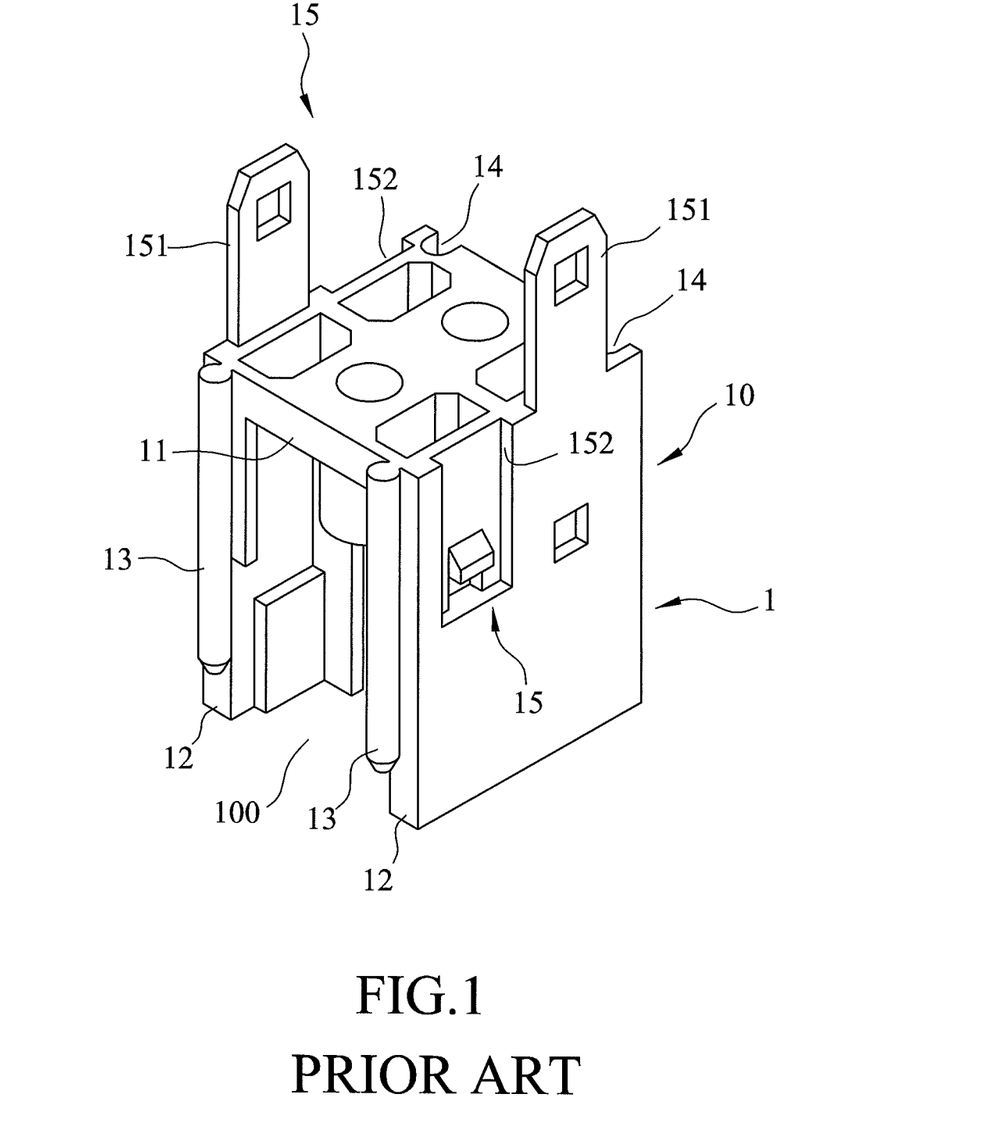
FIG. 1 is a perspective view of a conventional LC optical fiber cable adapter.
Figure 2:
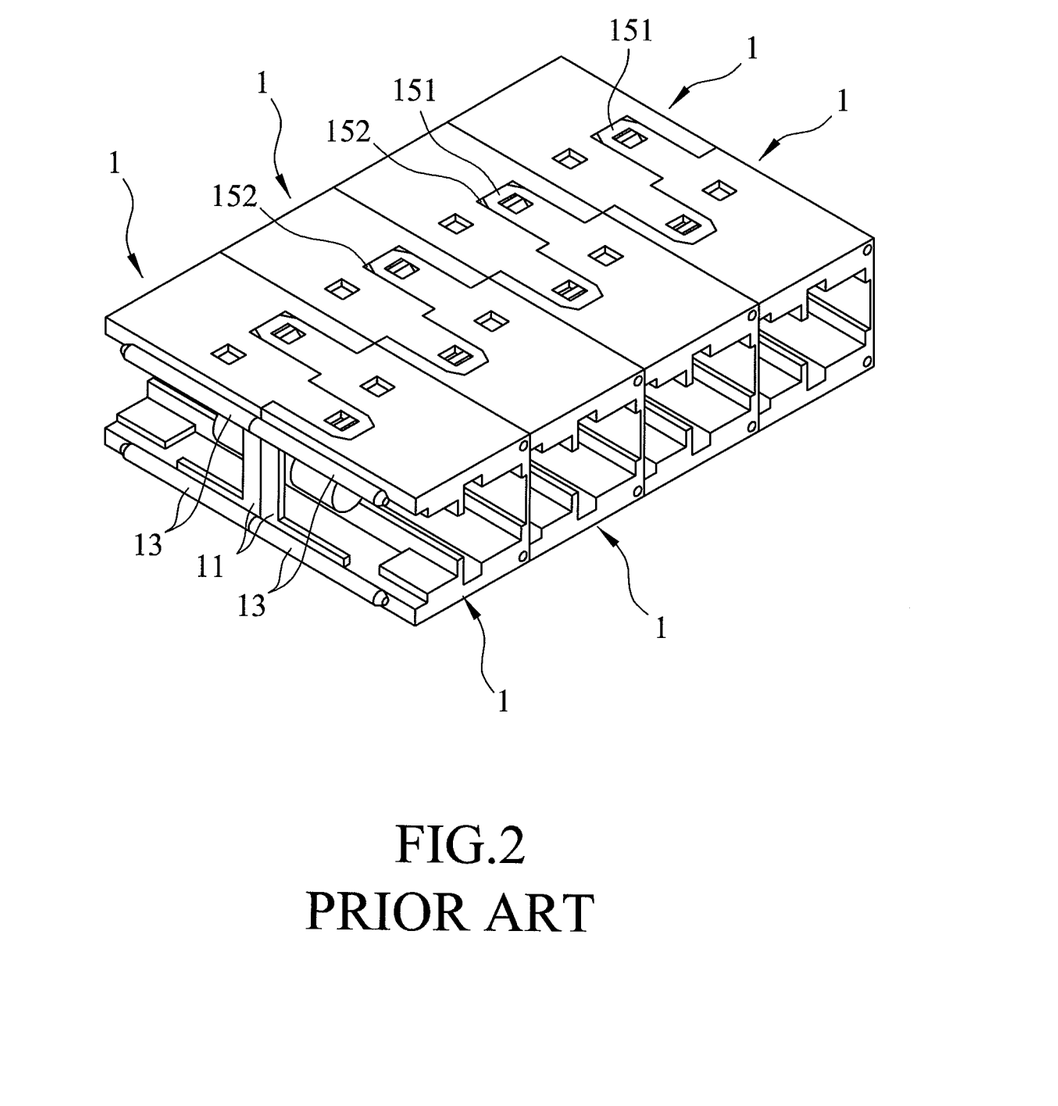
FIG. 2 is a perspective view illustrating a combination of eight of the conventional LC optical fiber cable adapters.

Referring to FIG. 1, a conventional LC optical fiber cable adapter 1 is shown to include a main body 10 formed with a chamber 100. The main body 10 includes a base wall 11, two side walls 12 extending from two opposite lateral edges of the base wall 11 in a same direction, two embedding members 13, and two embedding slots 14. Each of the embedding members 13 is formed on a lateral edge of a respective one of the side walls 12. Each of the embedding slots 14 is formed in an opposite lateral edge of a respective one of the side walls 12. The embedding members 13 are aligned respectively with the embedding slots 14 in the same direction. The main body 10 further includes a pair of snap engaging units 15 formed respectively on the side walls 12. Each of the snap engaging units 15 includes a snap engaging member 151 extending from the respective one of the side walls 12, and a snap engaging groove 152 formed in the respective one of the side walls 12. Therefore, two of the conventional LC optical fiber cable adapters 1 can be coupled together in a direction with the embedding members 13 of one of the conventional LC optical fiber cable adapters 1 engaging respectively the embedding slots 14 of the other one of the conventional LC optical fiber cable adapters 1, or in a transverse direction with the snap engaging members 151 and the snap engaging grooves 152 of one of the conventional LC optical fiber cable adapters 1 engaging respectively the snap engaging grooves 152 and the snap engaging members 151 of the other one of the conventional LC optical fiber cable adapters 1. For example, FIG. 2 illustrates a combination of eight of the conventional LC optical fiber cable adapters 1 that are coupled together.

However, the conventional LC optical fiber cable adapters 1 cannot be obliquely interconnected, which leads to a relatively low connection flexibility in the arrangement of a network using the conventional LC optical fiber cable adapters 1.

SUMMARY OF THE INVENTION

Therefore, the object of the present invention is to provide an LC optical fiber cable adapter that can eliminate the drawback associated with the abovementioned prior art.

Accordingly, an LC optical fiber cable adapter of the present invention is adapted for interconnecting at least one LC optical fiber cable and a terminal equipment. The LC optical fiber cable adapter comprises a main body and a connecting mechanism. The main body has a mounting end that is adapted to face the terminal equipment, and a coupling end that is opposite to the mounting end and that is adapted to be coupled to the LC optical fiber cable. The main body includes a base wall, first and second connecting walls and a closure wall. The first and second connecting walls extend in the same direction respectively from opposite lateral edges of the base wall. The first connecting wall has a first front wall segment and a first rear wall segment. The second connecting wall has a second front wall segment that corresponds in position to the first front wall segment of the first connecting wall, and a second rear wall segment that corresponds in position to the first rear wall segment of the first connecting wall. The mounting end of the main body is formed on the base wall and the first and second rear wall segments. The coupling end of the main body is formed on the base wall and the first and second front wall segments. The closure wall is connected to the first connecting wall and the second connecting wall, and is spaced apart from the base wall. The connecting mechanism includes a first connecting unit that is provided on an outer surface of the first front wall segment, and two second connecting units. Each of the second connecting units is provided on an outer surface of a respective one of the second front and rear wall segments of the second connecting wall, and has a contour matching that of the first connecting unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 3:
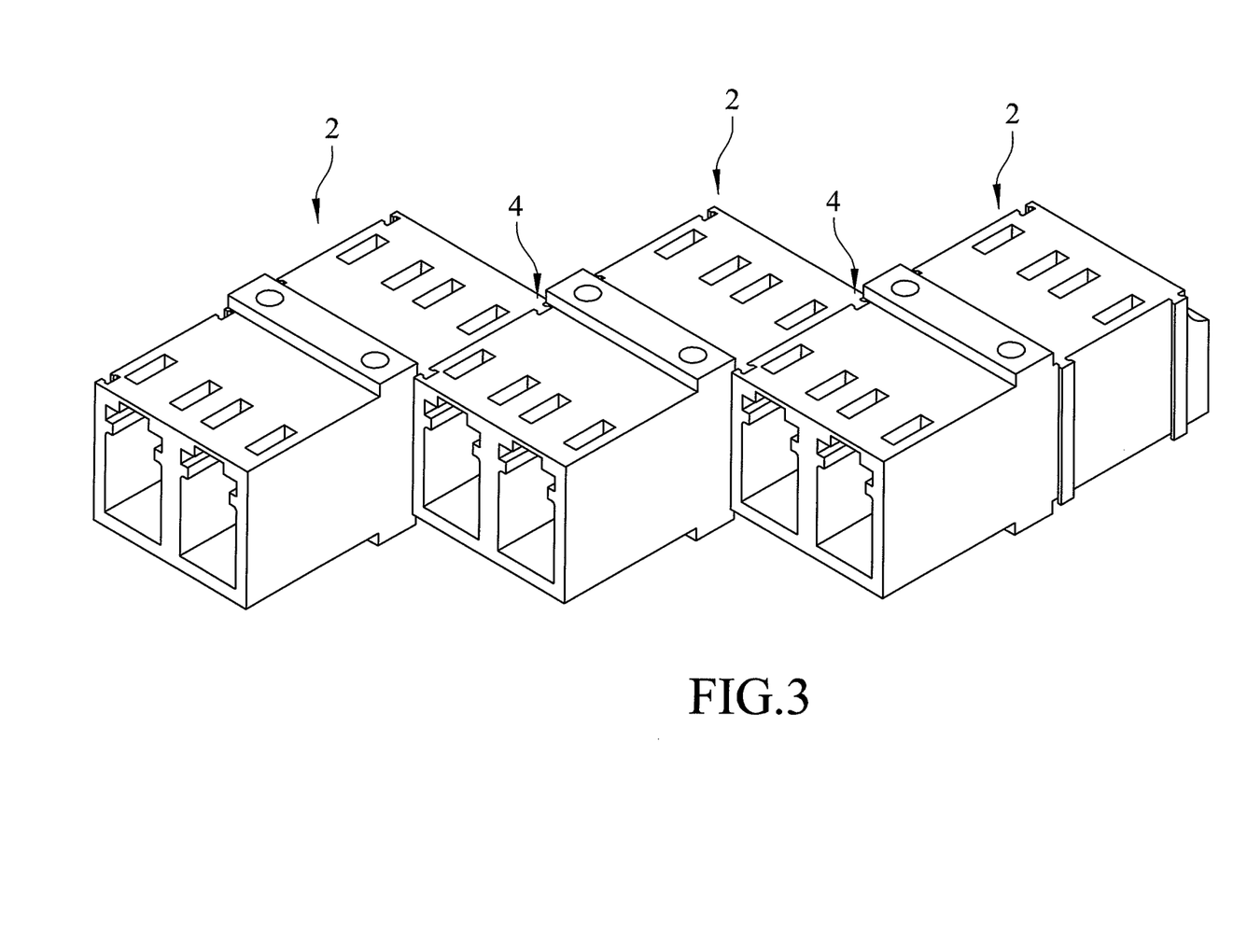
FIG. 3 is a perspective view of a first preferred embodiment of an LC optical fiber cable adapter assembly according to the present invention.
Figure 4:
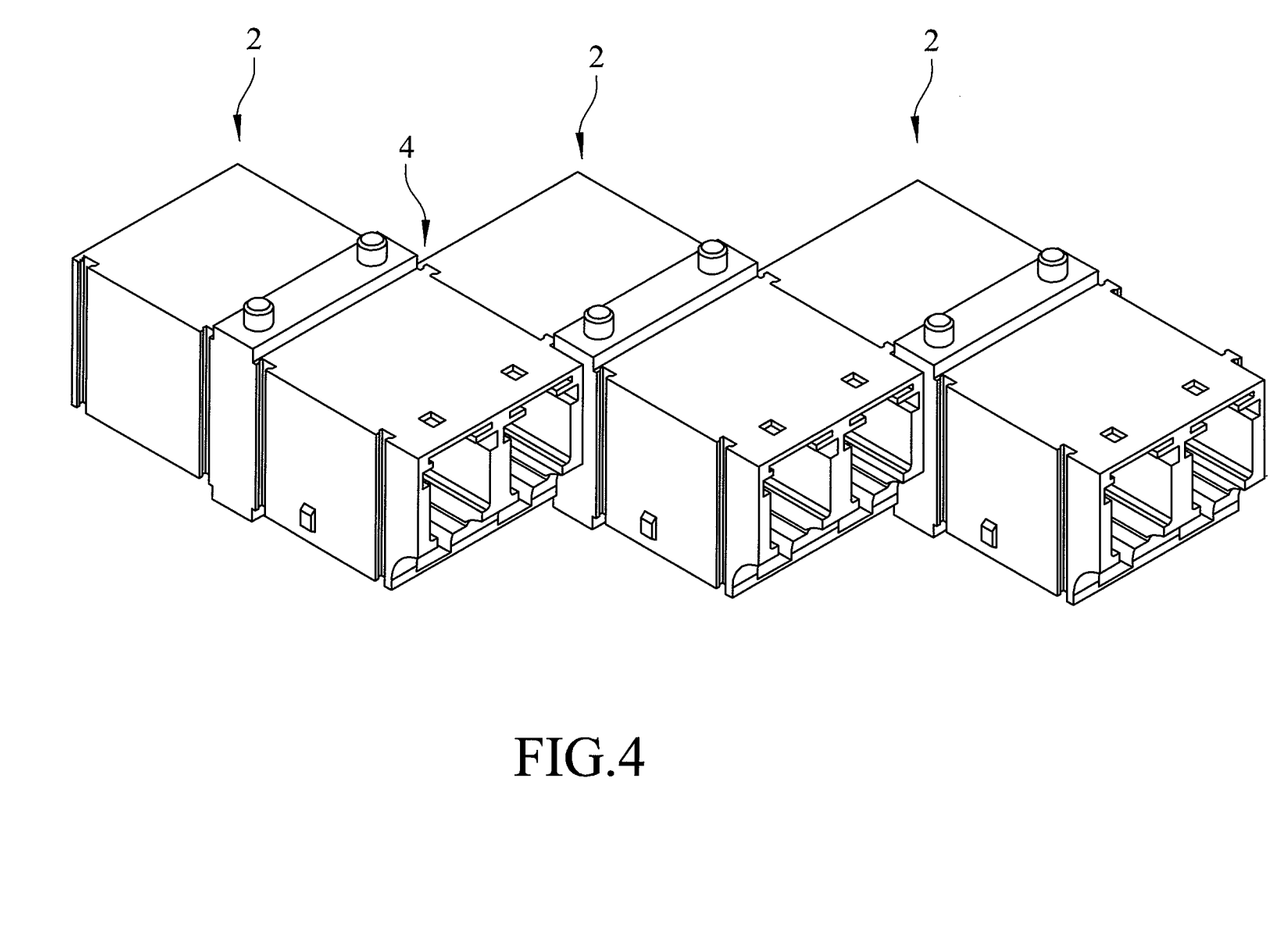
FIG. 4 is another perspective view of the first preferred embodiment.

As shown in FIGS. 3 and 4, the first preferred embodiment of an LC optical fiber cable adapter assembly according to the present invention comprises a plurality of LC optical fiber cable adapters 2. Each of the LC optical fiber cable adapters 2 is adapted for interconnecting at least one LC optical fiber cable (not shown) and a terminal equipment (not shown).

Figure 5:
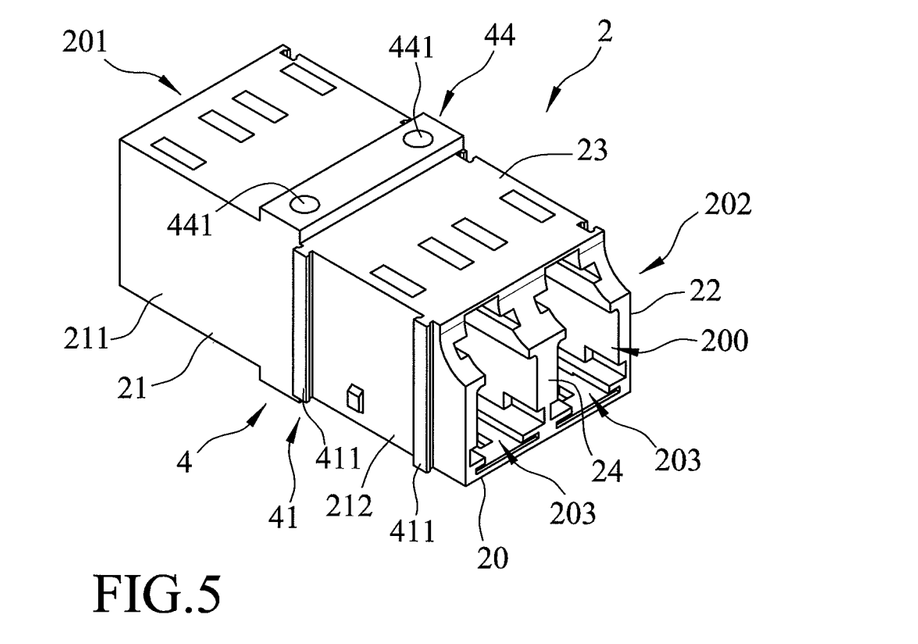
FIG. 5 is a perspective view of an LC optical fiber cable adapter of the first preferred embodiment.
Figure 6:
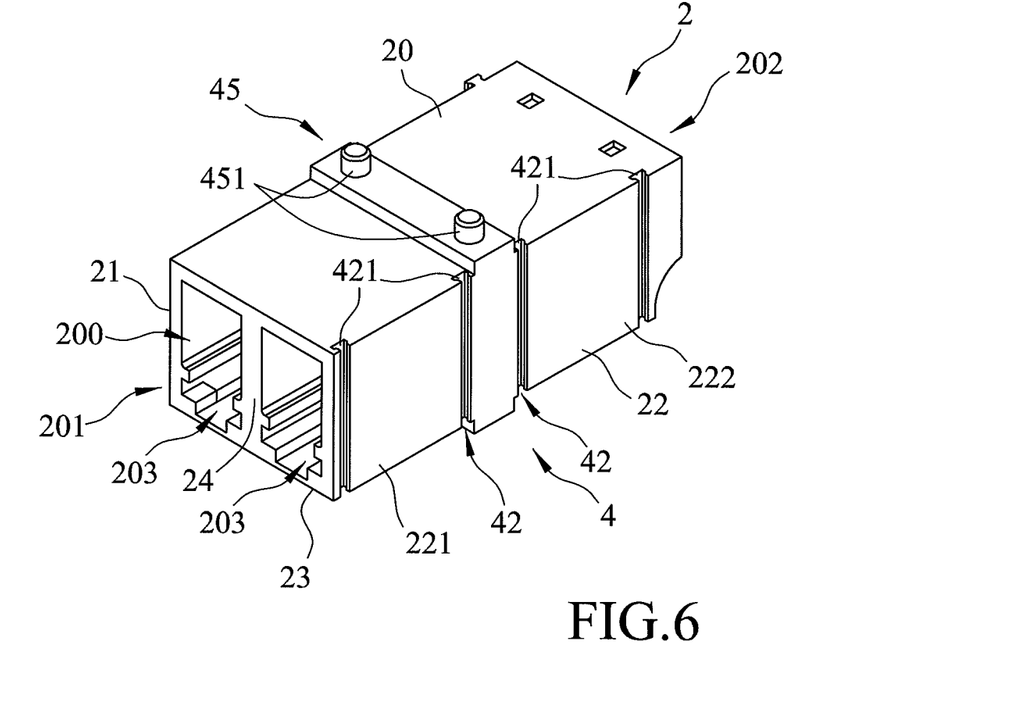
FIG. 6 is another perspective view of the LC optical fiber cable adapter of the first preferred embodiment.

As further shown in FIGS. 5 and 6, each of the LC optical fiber cable adapters 2 includes a main body and a connecting mechanism 4. The main body has a mounting end 201 that is adapted to face the terminal equipment, and a coupling end 202 that is opposite to the mounting end 201 and that is adapted to be coupled to the LC optical fiber cable. The main body includes a bases wall 20, a first connecting wall 21, a second connecting wall 22 and a first closure wall 23. The first and second connecting walls 21, 22 extend respectively from opposite lateral edges of the base wall 20 in the same direction. The first connecting wall 21 has a first front wall segment 212 and a first rear wall segment 211. The second connecting wall 22 has second front wall segment 222 that corresponds in position to the first front wall segment 212, and a second rear wall segment 221 that corresponds in position to the first rear wall segment 211. The mounting end 201 of the main body is formed on the base wall 20 and the first and second rear wall segments 211, 221. The coupling end 202 of the main body is formed on the base wall 20 and the first and second front wall segments 212, 222. The first closure wall 23 is connected to the first and second connecting walls 21, 22, and is spaced apart from the base wall 20. The first closure wall 23, the first and second connecting walls 21, 22 and the base wall 20 cooperatively define a chamber 200 thereamong. The main body further includes a first partition wall 24 that is disposed in the chamber 200, that is connected between the first closure wall 23 and the base wall 20, and that divides the chamber 200 into two cable ports 203.

The connecting mechanism 4 includes a first connecting unit 41 and two second connecting units 42. The first connecting unit 41 is provided on an outer surface of the first front wall segment 212. Each of the second connecting units 42 is provided on an outer surface of a respective one of the second front and rear wall segments 222, 221 of the second connecting wall 22, and has a contour that matches that of the first connecting unit 41. In this embodiment, the first connecting unit 41 includes two spaced-apart elongated connecting protrusions 411 extending in a direction from the first closure wall 23 toward the base wall 20, and each of the second connecting units 42 has two spaced-apart connecting grooves 421 extending in the direction from the first closure wall 23 toward the base wall 20. The connecting mechanism 4 further includes a first engaging member 44 provided on an outer surface of the first closure wall 23, and a first engaging component 45 provided on an outer surface of the base wall 20 and having a contour matches that of the first engaging member 44. In this embodiment, the first engaging member 44 is configured as two recesses 441, and the first engaging component 45 is configured as two protrusions 451. It should be noted that the configurations of the first engaging member 44 and the first engaging component 45 may be interchanged.

Figure 7:
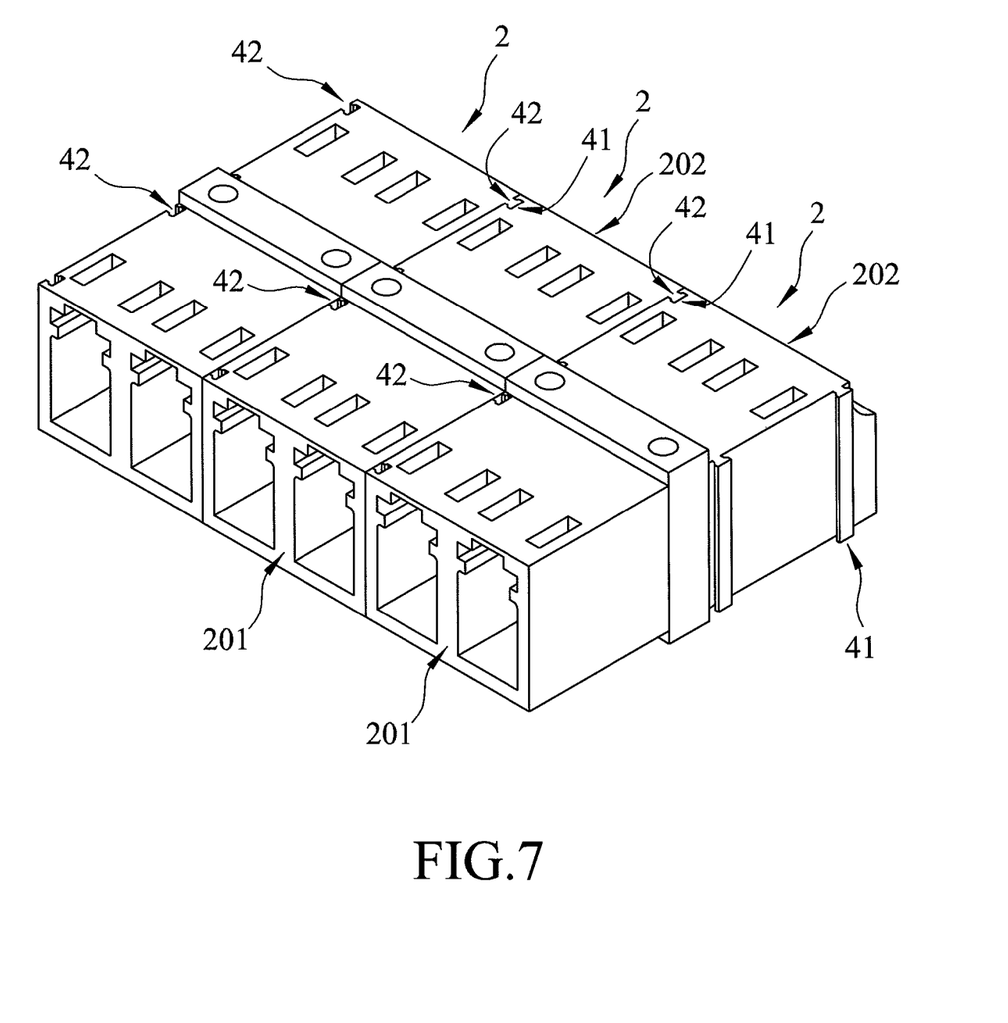
FIG. 7 is a perspective view illustrating another arrangement of the first preferred embodiment.
Figure 8:
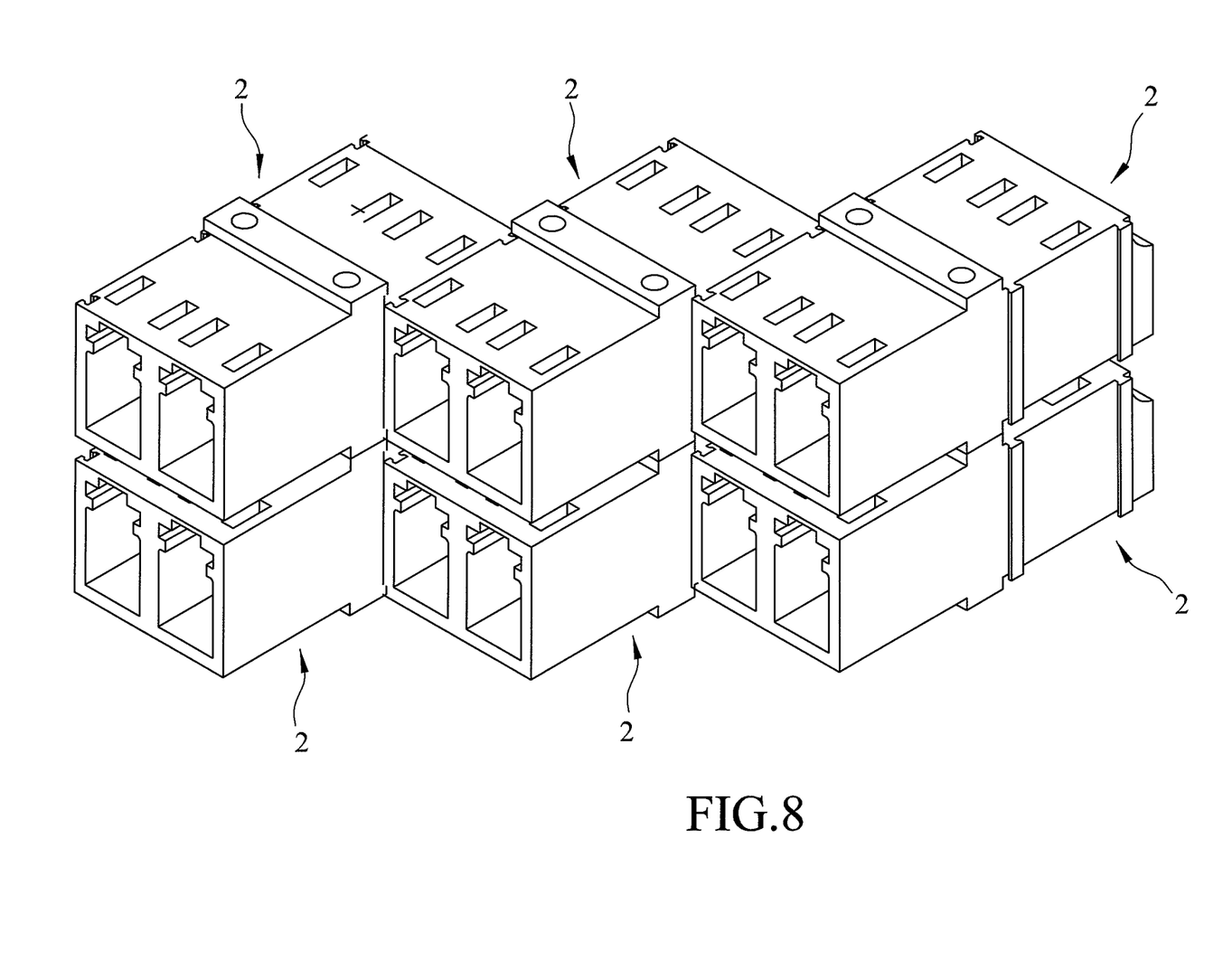
FIG. 8 is a perspective view illustrating yet another arrangement of the first preferred embodiment.

As such, as further shown in FIG. 7, one LC optical fiber cable adapter 2 can be coupled to another LC optical fiber cable adapter 2 with the connecting protrusions 411 of the first connecting unit 41 thereof engaging respectively, fittingly and removably the connecting grooves 421 of one of the second connecting units 42 which is formed in the second front wall segment 222 of the second connecting wall 22 of the another LC optical fiber cable adapter 2, such that the mounting ends 201 of the LC optical fiber cable adapters 2 are aligned with each other, and that the coupling ends 202 of the LC optical fiber cable adapters 2 are aligned with each other. As further shown in FIG. 8, one LC optical fiber cable adapter 2 can also be coupled to another LC optical fiber cable adapter 2 with the connecting protrusions 411 of the first connecting unit 41 thereof engaging respectively, fittingly and removably the connecting grooves 421 of one of the second connecting units 42 which is formed in the second rear wall segment 221 of the second connecting wall 22 of the another LC optical fiber cable adapter 2, such that the two LC optical fiber cable adapters 2 are obliquely connected.

Moreover, one LC optical fiber cable adapter 2 can also be coupled to another LC optical fiber cable adapter 2 with the protrusions 451 of the first engaging component 45 thereof engaging respectively, fittingly and removably the recesses 441 of the first engaging member 44 of the another LC optical fiber cable adapter 2, such that the two LC optical fiber cable adapters 2 are stacked together.

To sum up, by virtue of the configuration of the connecting mechanisms 4, the LC optical fiber cable adapters 2 can be interconnected in various directions, thereby alleviating the abovementioned drawbacks associated in the prior art.

Figure 9:
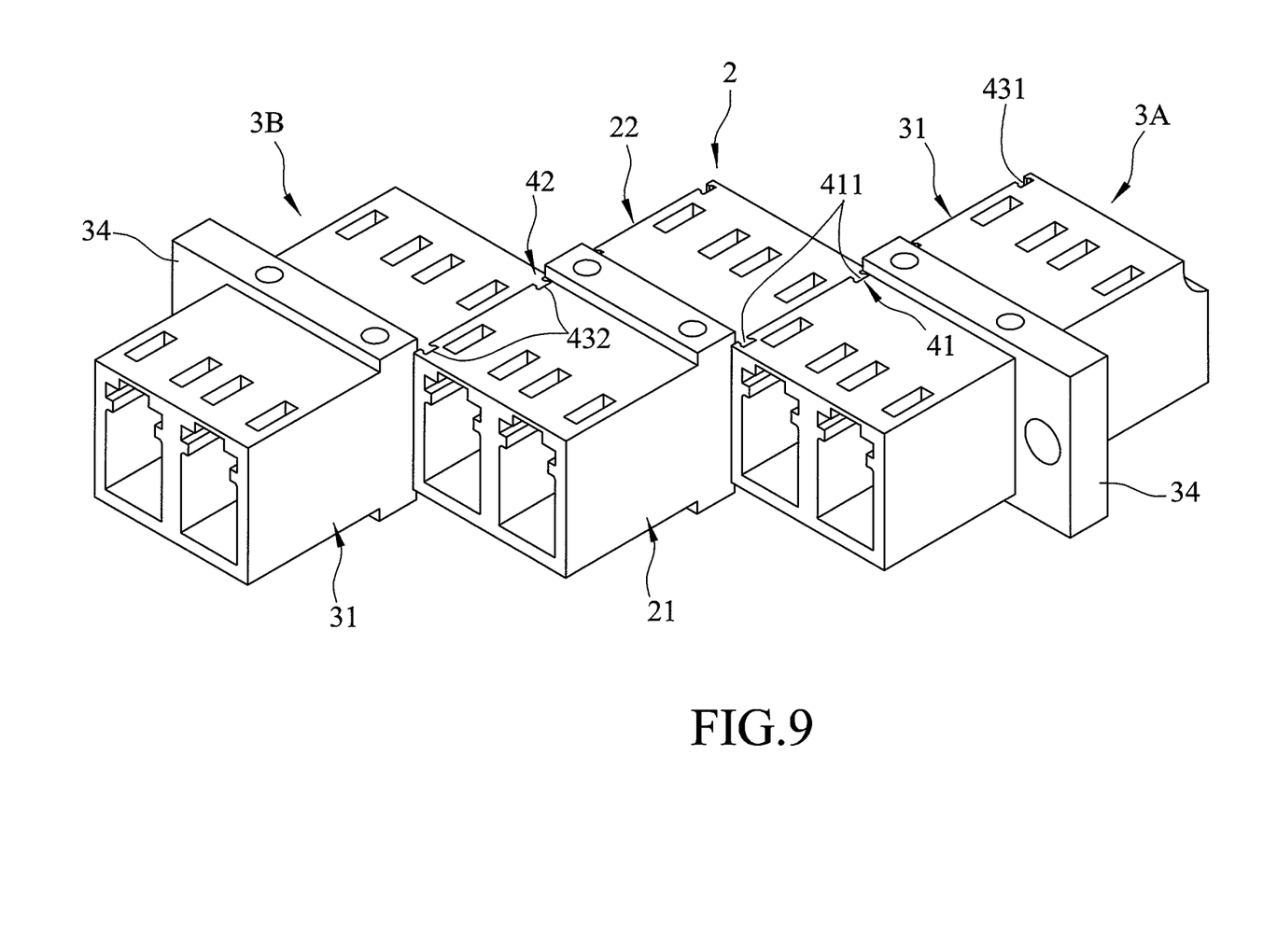
FIG. 9 is a perspective view of a second preferred embodiment of the LC optical fiber cable adapter assembly according to the present invention.

Referring to FIG. 9, the second preferred embodiment of the LC optical fiber cable adapter assembly according to the present invention has a structure similar to that of the first preferred embodiment. In this embodiment, the LC optical fiber cable adapter assembly is illustrated to include a main adapter 2 and two side adapters 3A, 3B. The main adapter 2 has a structure identical to that of the LC optical fiber cable adapter 2 of the first preferred embodiment. In this embodiment, the side adapters 3A, 3B are connected respectively to the first and second connecting walls 21, 22 of the main adapter 2.

Figure 10:
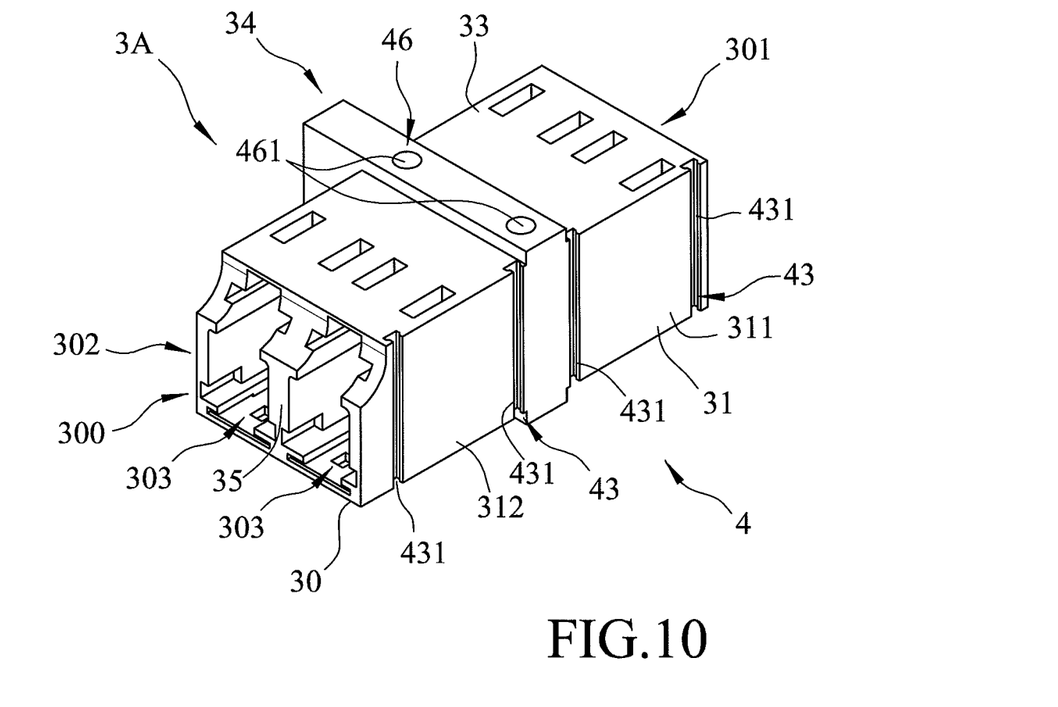
FIG. 10 is a perspective view of a side adapter of the second preferred embodiment.
Figure 11:
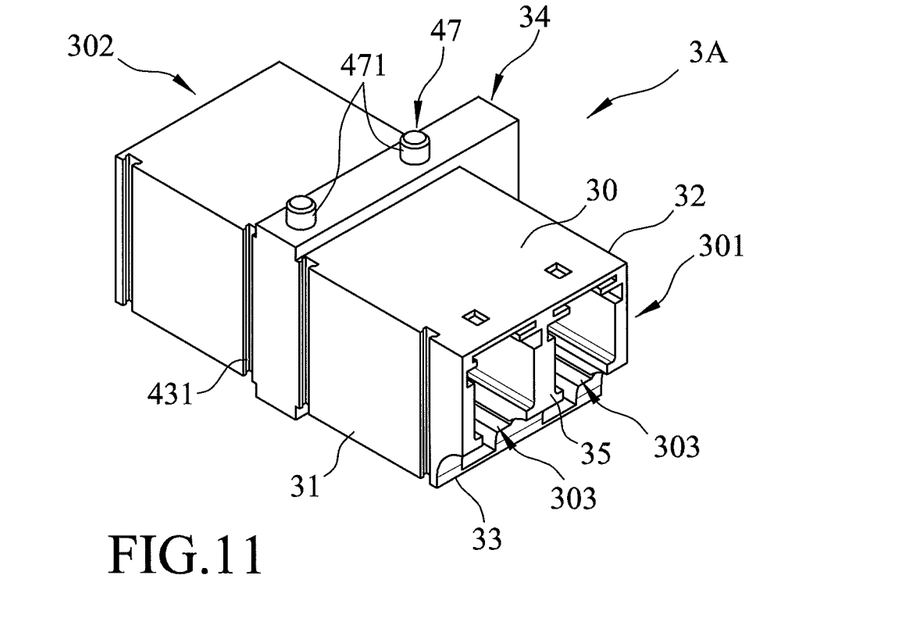
FIG. 11 is another perspective view of the side adapter.

Referring further to FIGS. 10 and 11, the side adapter 3A includes a side body that has a mounting end 301 adapted to face the terminal equipment, and a coupling end 302 opposite to the mounting end 301 and adapted to be coupled to an LC optical fiber cable. The side body includes a base wall 30, a linking wall 31, a side wall 32 and a second closure wall 33. The linking wall 31 and the side wall 32 extend from opposite lateral edges of the base wall 30 in the same direction. The linking wall 31 has a front wall section 312 and a rear wall section 311. The side wall 32 has a front wall section that corresponds in position to the front wall section 312 of the linking wall 31, and a rear wall section that corresponds in position to the rear wall section 311 of the linking wall 31. The mounting end 301 of the side body is formed on the base wall 30, the rear wall section 311 of the linking wall 31 and the rear wall section of the side wall 32. The coupling end 302 of the side body is formed on the base wall 30, the front wall section 312 of the linking wall 31 and the front wall section of the side wall 32. The second closure wall 33 is connected to the linking wall 31 and the side wall 32, and is spaced apart from the base wall 30. The second closure wall 33, the linking wall 31, the side wall 32 and the base wall 30 cooperatively define a chamber 300 thereamong. The side body further includes a second partition wall 35 that is disposed in the chamber 300, that is connected between the second closure wall 33 and the base wall 30, and that divides the chamber 300 into two cable ports 303.

The side body of the side adapter 3A further includes a fixing member 34 connected to and extending away from side wall 32 for being fixed to a reference surface, such as a wall. In this embodiment, the fixing member 34 is formed with an aperture so that the fixing member 34 can be fixed to the reference surface via a screw.

The connecting mechanism 4 of the side adapter 3A includes two connecting units 43. Each of the connecting units 43 is provided on an outer surface of a respective one of the front and rear wall sections 312, 311 of the linking wall 31, and has two spaced-apart connecting grooves 431 extending in the direction from the second closure wall 33 toward the base wall 30. As such, the side adapter 3A can be coupled to the main adapter 2 with the connecting protrusions 411 (see FIG. 5) of the first connecting unit 41 of the main adapter 2 engaging respectively, fittingly and removably the connecting grooves 431 of one of the connecting units 43 of the side adapter 3A.

The connecting mechanism 4 of the side adapter 3A further includes a second engaging member 46 provided on an outer surface of the second closure wall 33, and a second engaging component 47 provided on an outer surface of the base wall 30 and having a contour that matches that of the second engaging member 46. In this embodiment, the second engaging member 46 is configured as two recesses 461, and the second engaging component 47 is configured as two protrusions 471. As such, the side adapter 3A and the main adapter 2 can be stacked one on top of the other.

Figure 12:
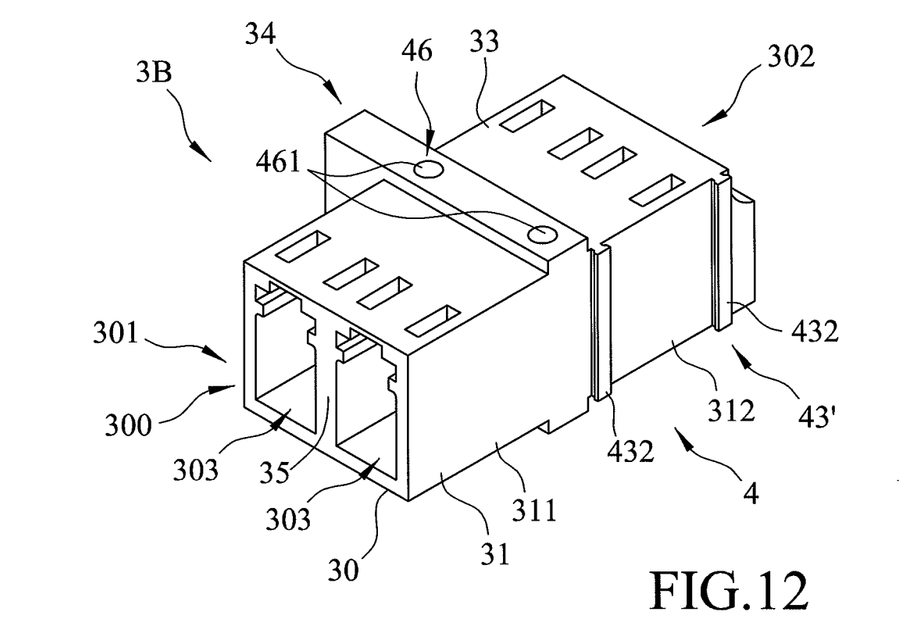
FIG. 12 is a perspective view of another side adapter of the second preferred embodiment.
Figure 13:
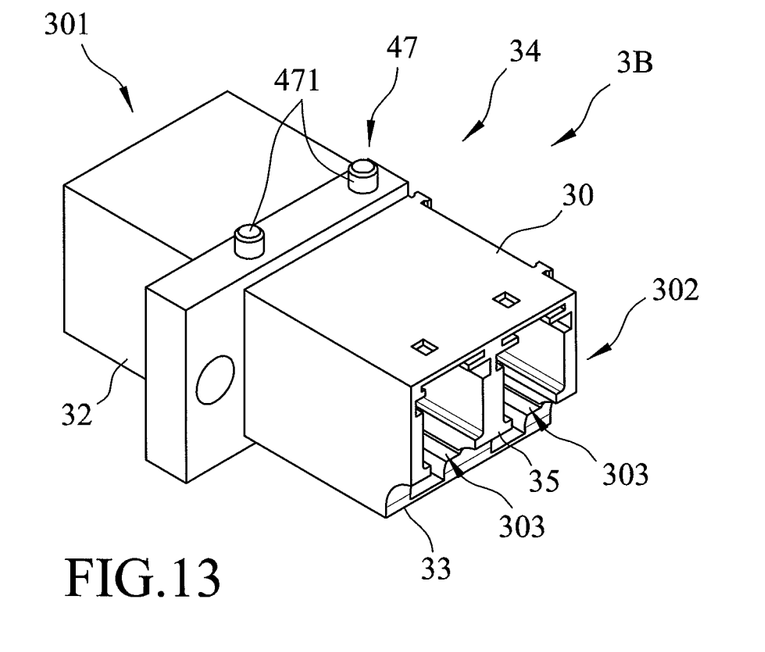
FIG. 13 is another perspective view of the another side adapter.
Figure 14:
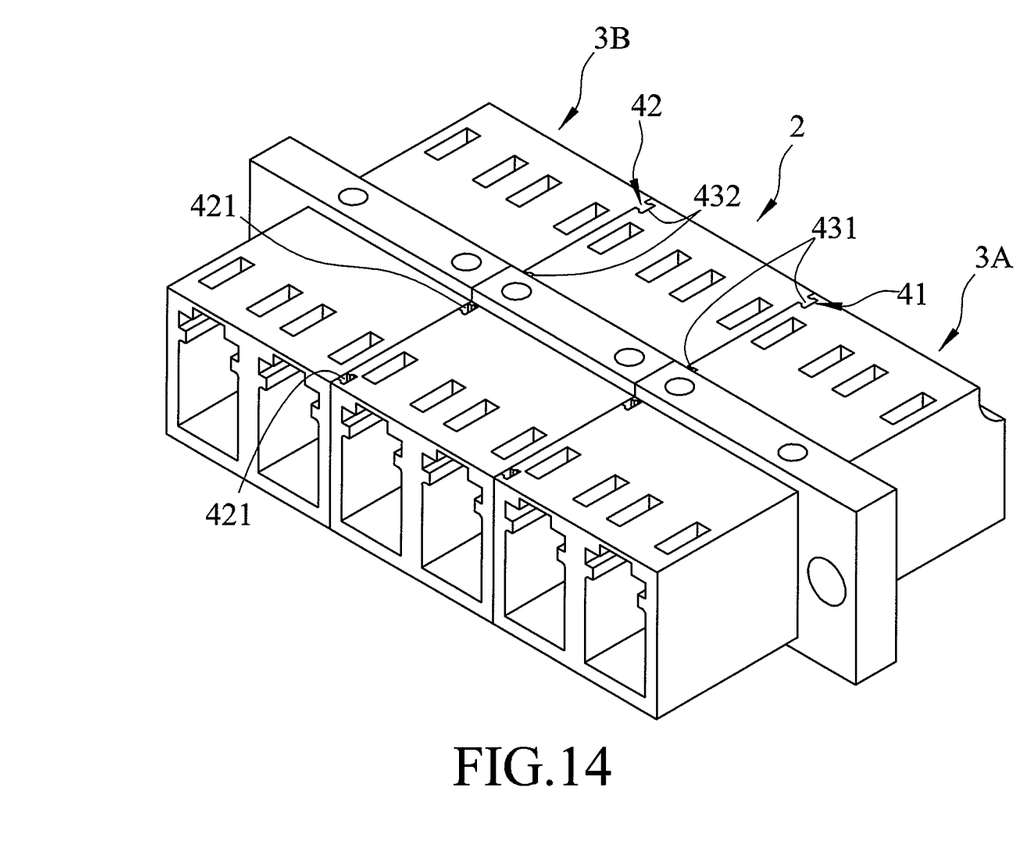
FIG. 14 is a perspective view illustrating another arrangement of the second preferred embodiment.

Referring back to FIG. 9, and further referring to FIGS. 12 to 14, the side adapters 3A, 3B are substantially symmetrical with respect to the main adapter 2. The connecting mechanism 4 of the side adapter 3B includes a connecting unit 43' provided on an outer surface of the front wall section 312 of the linking wall 31, and having two spaced-apart connecting protrusions 432 that extend in the direction from the second closure wall 33 toward the base wall 30. As such, the side adapter 3B can be coupled to the main adapter with the connecting protrusions 432 engaging respectively, fittingly and removably the connecting grooves 421 of one of the second connecting units 42 of the main adapter 2.

Figure 15:
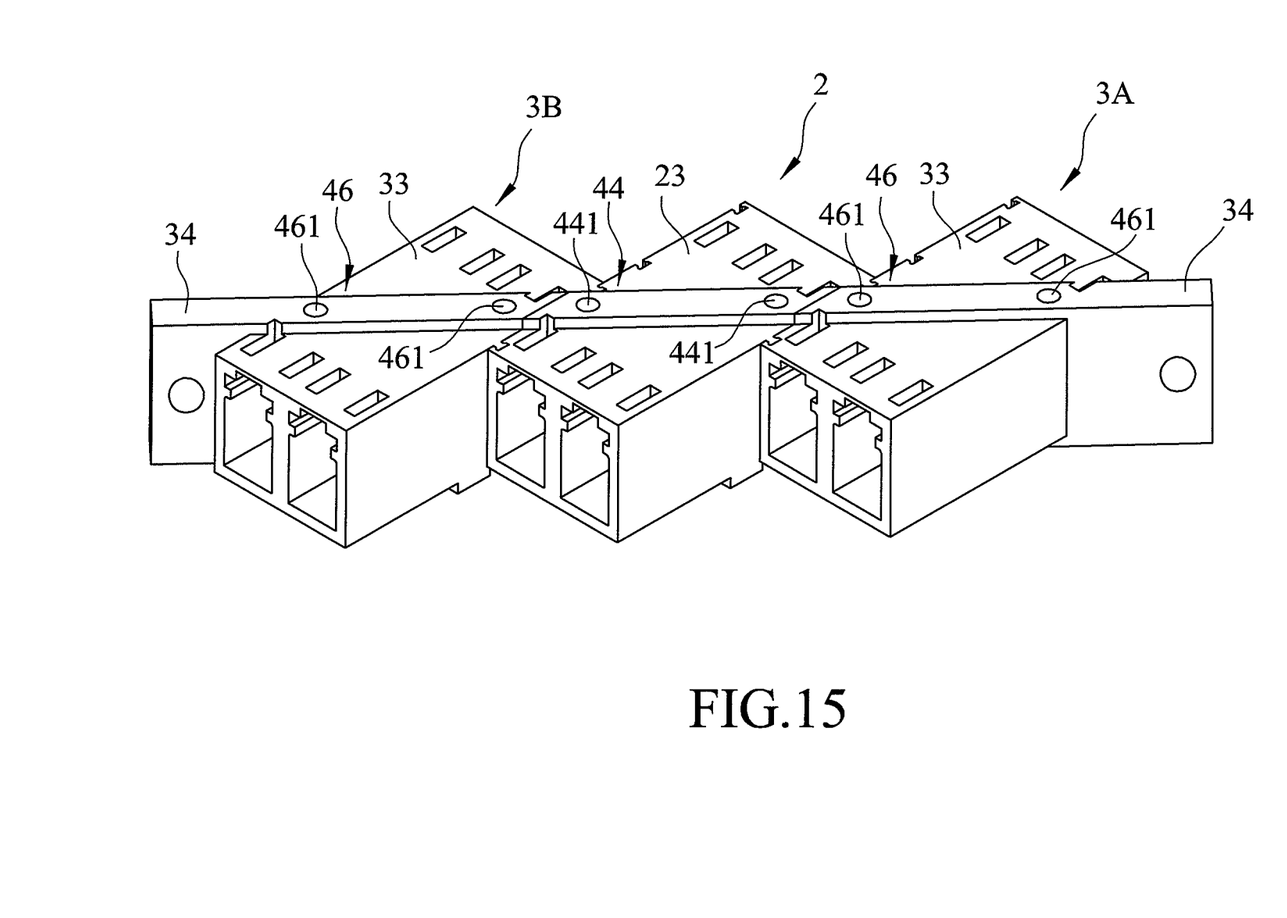
FIG. 15 is a perspective view of a modification of the second preferred embodiment.
Figure 16:
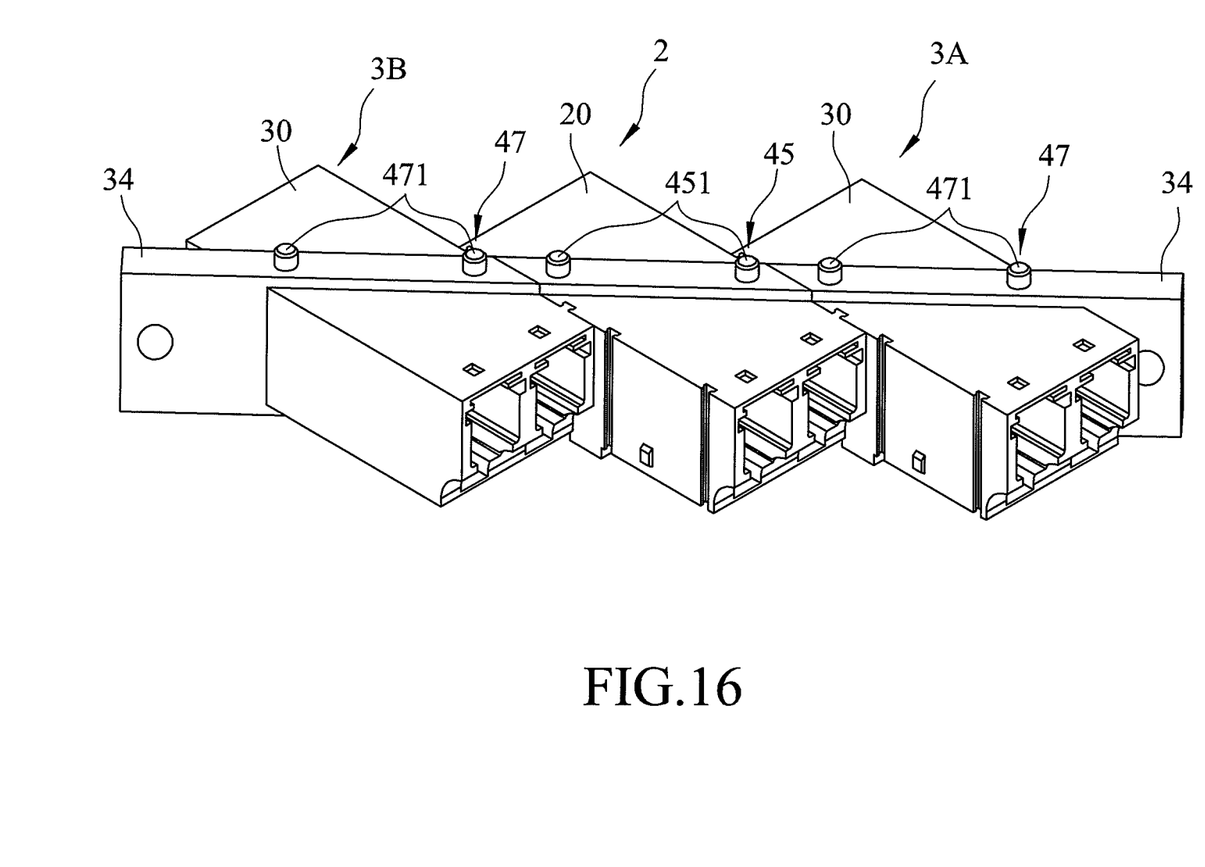
FIG. 16 is another perspective view of the modification of the second preferred embodiment shown in FIG. 15.
Figure 17:
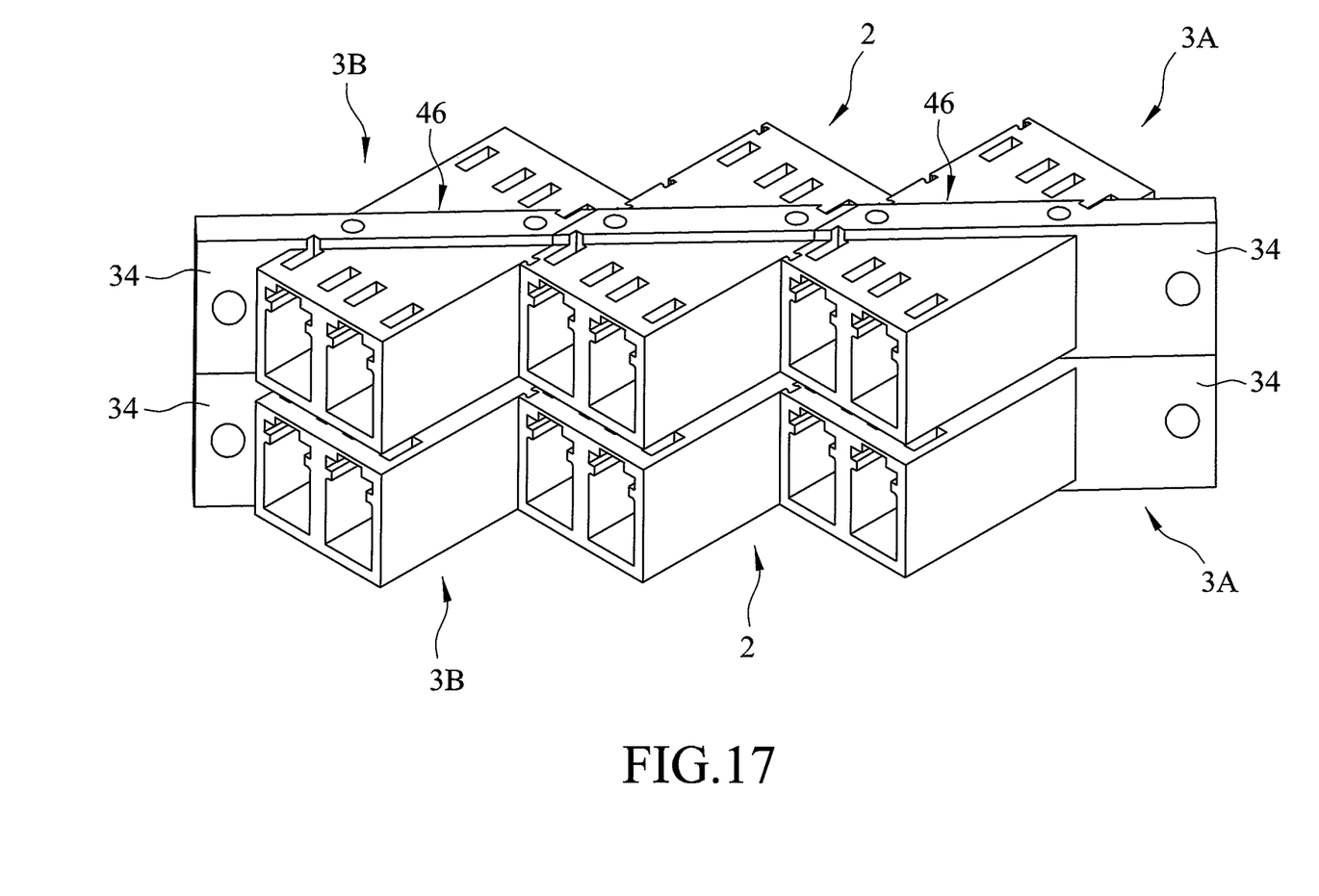
FIG. 17 is a perspective view illustrating the abovementioned modification in duplicate.

FIGS. 15 and 16 illustrate a modification of the second preferred embodiment, in which the recesses 441 of the main adapter 2 and the recesses 461 of the side adapters 3A, 3B are obliquely arranged along an oblique axis, and in which the protrusions 451 of the main adapter 2 and the protrusions 471 of the side adapters 3A, 3B are obliquely arranged along the oblique axis. The fixing members 34 of the side adapters 3A, 3B extend oppositely along the oblique axis. FIG. 17 illustrates the abovementioned modification in duplicate, coupled together and stacked one on top of the other.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An LC optical fiber cable adapter adapted for interconnecting at least one LC optical fiber cable and a terminal equipment, said LC optical fiber cable adapter comprising:
a main body having a mounting end that is adapted to face the terminal equipment and a coupling end that is opposite to said mounting end and that is adapted to be coupled to the LC optical fiber cable, said main body including
a base wall,
a first connecting wall and a second connecting wall that extend in the same direction respectively from opposite lateral edges of said base wall, said first connecting wall having a first front wall segment and a first rear wall segment, said second connecting wall having a second front wall segment that corresponds in position to said first front wall segment of said first connecting wall, and a second rear wall segment that corresponds in position to said first rear wall segment of said first connecting wall, said mounting end of said main body being formed on said base wall and said first and second rear wall segments, said coupling end of said main body being formed on said base wall and said first and second front wall segments, and
a closure wall that is connected to said first connecting wall and said second connecting wall, and that is spaced apart from said base wall; and
a connecting mechanism including a first connecting unit that is provided on an outer surface of said first front wall segment, and two second connecting units, each of which is provided on an outer surface of a respective one of said second front and rear wall segments of said second connecting wall, and has a contour the same with that of said first connecting unit.

2. The LC optical fiber cable adapter as claimed in claim 1, wherein:
said first connecting unit includes two spaced-apart connecting protrusions extending in a direction from said closure wall toward said base wall; and
each of said second connecting units has two spaced-apart connecting grooves extending in the direction from said closure wall toward said base wall.

3. The LC optical fiber cable adapter as claimed in claim 1, wherein said connecting mechanism further includes an engaging member provided on an outer surface of said closure wall, and an engaging component provided on an outer surface of said base wall and having a contour that matches that of said engaging member.

4. The LC optical fiber cable adapter as claimed in claim 1, wherein:
said closure wall, said first connecting wall, said second connecting wall and said base wall cooperatively define a chamber thereamong; and
said main body further includes a partition wall that is disposed in said chamber, that is connected between said closure wall and said base wall, and that divides said chamber into two cable ports.

5. An LC optical fiber cable adapter assembly comprising:
a main adapter including
a main body that has a mounting end adapted to face a terminal equipment, and a coupling end opposite to said mounting end and adapted to be coupled to an LC optical fiber cable, said main body including
a base wall,
a first connecting wall and a second connecting wall that extend in the same direction respectively from opposite lateral edges of said base wall, said first connecting wall having a first front wall segment and a first rear wall segment, said second connecting wall having a second front wall segment that corresponds in position to said first front wall segment of said first connecting wall, and a second rear wall segment that corresponds in position to said first rear wall segment of said first connecting wall, said mounting end of said main body being formed on said base wall and said first and second rear wall segments, said coupling end of said main body being formed on said base wall and said first and second front wall segments, and
a first closure wall that is connected to said first connecting wall and said second connecting wall, and that is spaced apart from said base wall, and
a connecting mechanism that includes
a first connecting unit provided on an outer surface of said first front wall segment, and including two connecting protrusions spaced apart from each other, each of said connecting protrusions extending in a direction from said first closure wall toward said base wall, and
two second connecting units, each of which is provided on an outer surface of a respective one of said second front and rear wall segments of said second connecting wall, and has two spaced-apart connecting grooves extending in the direction from said first closure wall toward said base wall and having a contour that matches that of said first connecting unit; and
a side adapter including
a side body that has a mounting end adapted to face the terminal equipment, and a coupling end opposite to said mounting end and adapted to be coupled to an LC optical fiber cable, said side body including
a base wall,
a linking wall and a side wall that extend in the same direction respectively from opposite lateral edges of said base wall, said linking wall having a front wall section and a rear wall section, said side wall having a front wall section that corresponds in position to that of said linking wall, and a rear wall section that corresponds in position to that of said linking wall, said mounting end of said side body being formed on said base wall and said rear wall sections of said linking wall and said side wall, said coupling end of said side body being formed on said base wall and said front wall sections of said linking wall and said side wall, and
a second closure wall that is connected to said linking wall and said side wall, and that is spaced apart from said base wall, and
a connecting mechanism that includes two connecting units, each of which is provided on an outer surface of a respective one of said front and rear wall sections of said linking wall, and has two spaced-apart connecting grooves extending in the direction from said second closure wall toward said base wall, said connecting protrusions of said first connecting unit of said main adapter engaging respectively and removably said connecting grooves of one of said connecting units of said side adapter.

6. The LC optical fiber cable adapter assembly as claimed in claim 5, wherein:
said connecting mechanism of said main adapter further includes a first engaging member provided on an outer surface of said first closure wall, and a first engaging component provided on an outer surface of said base wall and having a contour that matches that of said first engaging member; and
said connecting mechanism of said side adapter further includes a second engaging member provided on an outer surface of said second closure wall, and a second engaging component provided on an outer surface of said base wall and having a contour that matches that of said second engaging member.

7. The LC optical fiber cable adapter assembly as claimed in claim 5, wherein said side body of said side adapter further includes a fixing member connected to and extending away from said side wall and adapted for being fixed to a reference surface.

8. The LC optical fiber cable adapter assembly as claimed in claim 5, wherein:
said first closure wall, said first connecting wall, said second connecting wall and said base wall of said main body of said main adapter cooperatively define a chamber thereamong, said main body of said main adapter further including a first partition wall that is disposed in said chamber, that is connected between said first closure wall and said base wall, and that divides said chamber into two cable ports; and
said second closure wall, said linking wall, said side wall and said base wall of said side body of said side adapter cooperatively define a chamber thereamong, said side body of said side adapter further including a second partition wall that is disposed in said chamber, that is connected between said second closure wall and said base wall, and that divides said chamber into two cable ports.

9. An LC optical fiber cable adapter assembly comprising:
a main adapter including
a main body that has a mounting end adapted to face a terminal equipment, and a coupling end opposite to said mounting end and adapted to be coupled to an LC optical fiber cable, said main body including
a base wall,
a first connecting wall and a second connecting wall that extend in the same direction respectively from opposite lateral edges of said base wall, said first connecting wall having a first front wall segment and a first rear wall segment, said second connecting wall having a second front wall segment that corresponds in position to said first front wall segment of said first connecting wall, and a second rear wall segment that corresponds in position to said first rear wall segment of said first connecting wall, said mounting end of said main body being formed on said base wall and said first and second rear wall segments, said coupling end of said main body being formed on said base wall and said first and second front wall segments, and
a first closure wall that is connected to said first connecting wall and said second connecting wall, and that is spaced apart from said base wall, and
a connecting mechanism that includes
a first connecting unit provided on an outer surface of said first front wall segment, and including two connecting protrusions spaced apart from each other, each of said connecting protrusions extending in a direction from said first closure wall toward said base wall, and
two second connecting units, each of which is provided on an outer surface of a respective one of said second front and rear wall segments of said second connecting wall, and has two spaced-apart connecting grooves extending in the direction from said first closure wall toward said base wall and having a contour that matches that of said first connecting unit; and
a side adapter including a side body that has a mounting end adapted to face the terminal equipment, and a coupling end opposite to said mounting end and adapted to be coupled to an LC optical fiber cable, said side body including
a base wall,
a linking wall and a side wall that extend in the same direction respectively from opposite lateral edges of said base wall, said linking wall having a front wall section and a rear wall section, said side wall having a front wall section that corresponds in position to that of said linking wall, and a rear wall section that corresponds in position to that of said linking wall, said mounting end of said side body being formed on said base wall and said rear wall sections of said linking wall and said side wall, said coupling end of said side body being formed on said base wall and said front wall sections of said linking wall and said side wall, and
a second closure wall that is connected to said linking wall and said side wall, and that is spaced apart from said base wall, and
a connecting mechanism that includes a connecting unit provided on an outer surface of said front wall section of said linking wall, and having two spaced-apart connecting protrusions that extend in the direction from said second closure wall toward said base wall, and that engage respectively and removably said connecting grooves of one of said second connecting units of said main adapter.

10. The LC optical fiber cable adapter assembly as claimed in claim 9, wherein:
said connecting mechanism of said main adapter further includes a first engaging member provided on an outer surface of said first closure wall, and a first engaging component provided on an outer surface of said base wall and having a contour that matches that of said first engaging member; and
said connecting mechanism of said side adapter further includes a second engaging member provided on an outer surface of said second closure wall, and a second engaging component provided on an outer surface of said base wall and having a contour that matches that of said second engaging member.

11. The LC optical fiber cable adapter assembly as claimed in claim 9, wherein said side body of said side adapter further includes a fixing member connected to and extending away from said side wall and adapted for being fixed to a reference surface.

12. The LC optical fiber cable adapter assembly as claimed in claim 9, wherein:
said first closure wall, said first connecting wall, said second connecting wall and, said base wall of said main body of said main adapter cooperatively define a chamber thereamong, said main body of said main adapter further including a first partition wall that is disposed in said chamber, that is connected between said first closure wall and said base wall, and that divides said chamber into two cable ports; and
said second closure wall, said linking wall, said side wall and said base wall of said side body of said side adapter cooperatively define a chamber thereamong, said side body of said side adapter further including a second partition wall that is disposed in said chamber, that is connected between said second closure wall and said base wall, and that divides said chamber into two cable ports.

* * * * *